(12) United States Patent
Larsson

(10) Patent No.: US 7,301,300 B2
(45) Date of Patent: Nov. 27, 2007

(54) METHOD AND CIRCUIT ARRANGEMENT FOR OPERATING STEPPER MOTORS

(75) Inventor: Lars Larsson, Hamburg (DE)

(73) Assignee: Trinamic Motion Control GmbH & Co. KG, Hamburg (DE)

( * ) Notice: Subject to any disclaimer, the term of this patent is extended or adjusted under 35 U.S.C. 154(b) by 444 days.

(21) Appl. No.: 10/517,174

(22) PCT Filed: Jun. 7, 2003

(86) PCT No.: PCT/EP03/06019

§ 371 (c)(1),
(2), (4) Date: Dec. 7, 2004

(87) PCT Pub. No.: WO03/105332

PCT Pub. Date: Dec. 18, 2003

(65) Prior Publication Data

US 2006/0049791 A1    Mar. 9, 2006

(30) Foreign Application Priority Data

Jun. 7, 2002    (DE) .............................. 102 25 610

(51) Int. Cl.
G05B 19/40    (2006.01)

(52) U.S. Cl. ........................................ 318/685; 318/696
(58) Field of Classification Search .................. None
See application file for complete search history.

(56) References Cited

U.S. PATENT DOCUMENTS

| | | | |
|---|---|---|---|
| 4,480,218 A * | 10/1984 | Hair .......................... | 318/696 |
| 6,091,221 A * | 7/2000 | Higuchi ...................... | 318/685 |
| 6,163,126 A * | 12/2000 | Kojima et al. ............. | 318/685 |
| 6,262,554 B1 * | 7/2001 | Kojima et al. ............. | 318/685 |

* cited by examiner

Primary Examiner—Lincoln Donovan
Assistant Examiner—Erick Glass
(74) Attorney, Agent, or Firm—Akerman Senterfitt; Stephen A. Pendorf

(57) ABSTRACT

A method and a circuit arrangement for operating stepper motors or other appropriately dimensioned synchronous motors is disclosed in which between a first operational mode for normal motor operation and a second operational mode for detecting an operating state of the motor like for example its load can be switched. The method and the circuit arrangement is especially provided for determining a reference position of the motor without sensors by driving the motor against a mechanical stop wherein an increase of the load which is caused by this, is detected as a change of the operating state (FIG. 1).

10 Claims, 3 Drawing Sheets

METHOD AND CIRCUIT ARRANGEMENT FOR OPERATING STEPPER MOTORS

CROSS REFERENCE TO RELATED APPLICATION

This application is a national stage of PCT/EP03/06019 filed Jun. 7, 2003 and based upon DE 102 25 610.1 filed Jun. 7, 2002 under the International Convention.

FIELD OF THE INVENTION

The invention relates to a method and circuit arrangement for operating stepper motors or other appropriately designed synchronous motors.

BACKGROUND OF THE INVENTION

It is generally known that the movement and positioning of stepper motors can be precisely controlled. The rotational position of a magnetic rotor follows a magnetic field which is generated by driving phase shifted currents into a plurality of coils which are positioned around the rotor. If a stepper motor shall be used not only for a relative but as well for an absolute positioning of an object, at first a reference position has to be determined with respect to which the absolute position can be referenced. Then, a controlled absolute positioning is possible as long as the stepper motor is controlled under consideration of his characteristic movement parameters like the rotation angle, the velocity and the acceleration.

For determining a reference position, substantially two alternatives are known. These are on the one hand the mechanical reference run in which the motor is driven against a mechanical limit or stop which serves as a reference position and on the other hand the electric reference run in which a sensor (for example an electro mechanical switch or a light barrier) generates a related signal upon reaching the reference position.

Both alternatives have advantages and disadvantages. While the mechanical reference run may be connected with the development of noise and an increased wear due to the mechanical load, the realization of the electrical reference run is, due to the sensors, connected with higher cost, higher constructive requirements for the integration of the sensors into a mechatronic system and additional cabling requirements wherein especially under rough environment conditions the reliability of the sensors can create a problem.

Furthermore it has to be considered that by certain operating states like a suddenly occuring change of load due to an obstacle or similar, a loss of steps during a current operation of the stepper motor may occur or the stepper motor may even stop so that a new reference run becomes necessary. However, there are certain applications in which during a current operation of the motor a reference run is not possible so that besides the first time determination of the reference position as well a monitoring of the operating states of the stepper motor during the current operation— especially without any additional sensors—is desired.

EP 0 182 490 discloses a method for controlling a rotation detector circuit arrangement with which it is determined whether a driving pulse which is supplied to a stepper motor effects that the rotor is rotating in the correct direction. The rotation is substantially detected by connecting an element with a high and low impedance, respectively, electrically with a coil of the motor upon operating a first and a second circuit device, respectively, and by feeding first, second and third signals to the first and second circuit device in order to separate the element with the low impedance from the coil while the element with the high impedance is connected with the coil at the time of the detection of the rotation.

EP 1 017 159 discloses a method for controlling a voltage/frequency converter controlled single phase or polyphase electric motor with which a phase shift between an EMF voltage and a BEMF voltage is evaluated by way of the deviation between the zero crossing of the phase current and the voltage generated by the intrinsic induction and the frequency of the converter is accordingly readjusted. The measurement of the intrinsic induction is effected in this zero crossing of the current course of the associated phase, wherein during the measurement the phase is separated from the supply network.

SUMMARY OF THE INVENTION

A general object underlying the invention is to provide a method and a circuit arrangement for operating a stepper motor (or another appropriately designed synchronous motor) with which in a simple manner an operating state of the motor can be monitored.

Especially it is an object of the invention to provide a method and a circuit arrangement for operating a stepper motor (or another appropriately designed synchronous motor) with which in a simple manner a load recognition and by this as well a determination of a reference position of the motor can be conducted.

The object is solved according to claim 1 by a method for operating a stepper motor in a first operational mode for a normal (regular) motor operation in which an alternating current is impressed into at least one of the coils of the stepper motor and a second operational mode for detecting an operating state and a load state, respectively, of the motor from the level of a measuring current which flows through a short-circuited coil which is substantially generated by a voltage which is counter induced by a rotor of the motor in the coil, wherein the second operational mode for the coil is activated during a time window of the first operational mode when the alternating current which is impressed into the related coil approaches to a zero crossing.

Furthermore, the object is solved according to claim 6 by a circuit arrangement for operating a stepper motor, especially according to a method according to the invention, which comprises a device which is provided for detecting an operating state and a load state, respectively, of the motor from the level of a measuring current which flows through a short-circuited coil which is substantially generated by a voltage which is counter induced by a rotor of the motor in the coil when the alternating current which is impressed into the related coil approaches to a zero crossing.

A general advantage of this solution is that no sensors are necessary and a relatively simple realization at low costs is possible especially if the motor is operated by puls width modulation (PWM) of a voltage which impresses a corresponding current into the coils of the motor (coil current) because the components which are necessary for evaluating the measuring current (short-circuited current) are substantially existing in a PWM-circuit.

Another advantage of this solution is that due to the control of the coil current (target current) by the PWM-voltage the beginning of the measuring current (current lobe) can be reproduced very well and is largely independent of the level of this voltage. By this, an at least extensive independency on tolerances of components is achieved.

Furthermore it has revealed that an at least largely linear interrelationship exists between the level of the measuring current and the power which is withdrawn by a mechanical load. This has especially the consequence that the measuring current decreases with increasing mechanical load on the motor.

Background is the fact that with increasing load on the motor and a load angle (angle between the rotor and the main direction of the magnetic field generated by the coils) which increases with the load, the phase shift between the coil current impressed into the coil and the voltage which is counter induced by the rotor, is decreasing (and is zero when the motor stops).

Because at constant speed the mechanical power of the motor is proportional to the force of the motor and the torque of the motor, respectively, the level of the measuring current (current lobe) directly represents at constant speed the level of the torque of the load on the motor and together with the characteristic of the torque of the related motor indirectly represents the load angel.

Especially by driving the motor against a mechanical stop and the change of the operating state and the load state, respectively, which is caused by this, a reference position of the motor can be detected without sensors. The disadvantages which are usually connected with a determination of a reference position without sensors like mechanical wear and the development of noise do not occur or occur only to a considerably smaller extent.

An advantage of the above explained nearly direct load and torque measurement, respectively, by means of the (mechanical) reference run is that this is largely independent from the modulus of elasticity of the mechanical stop.

The subclaims comprise advantageous embodiments of the invention.

BRIEF DESCRIPTION OF THE DRAWINGS

Further details, features and advantages of the invention are disclosed in the following description of preferred embodiments with respect to the drawing in which shows.

DETAILED DESCRIPTION OF THE DRAWINGS

Figure 1:
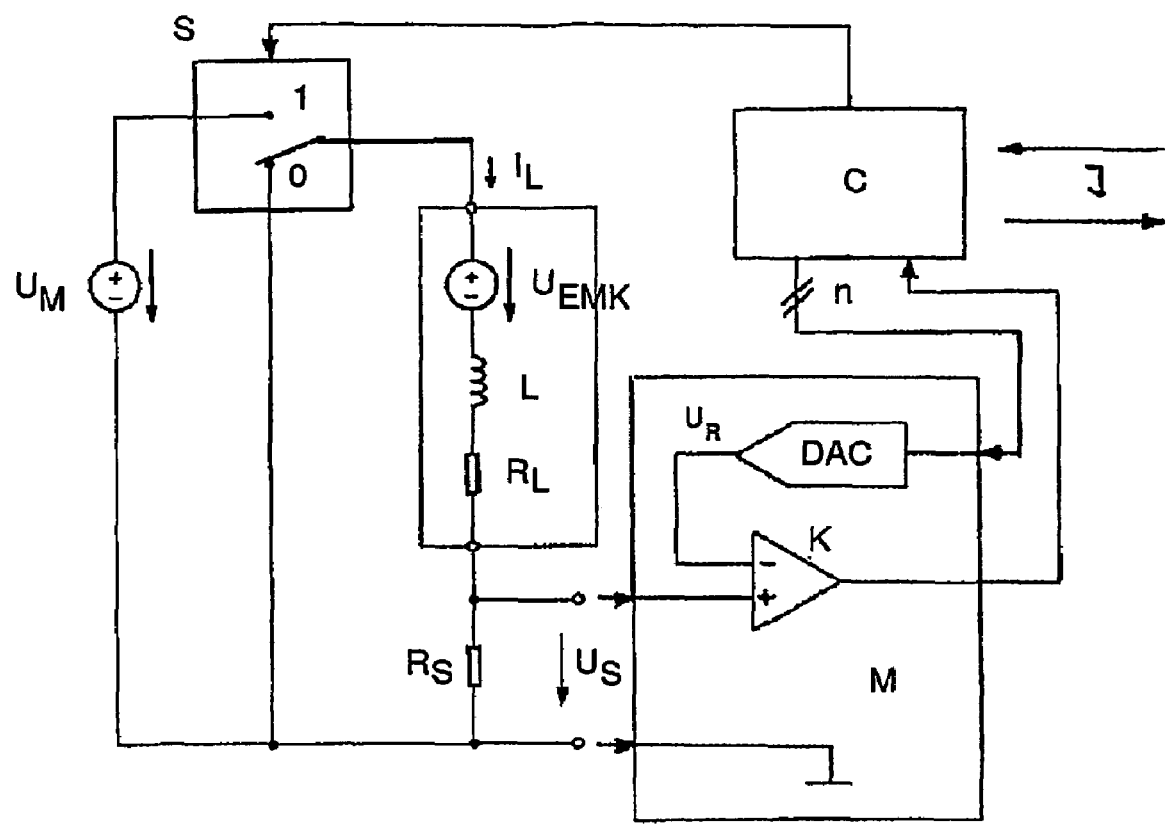
FIG. 1 a schematic block diagram of a first circuit arrangement according to the invention.

FIG. 1 shows a schematic block diagram of a circuit arrangement which can be switched by means of a switch S between a first operational mode for a normal motor operation (switch position 1) and a second operational mode for detecting an operating state and especially a reference position of the motor (switch position 0) which is determined by a measuring a change of the mechanical load when driving the stepper motor against a mechanical stop.

The stepper motor itself is only indicated in the form of one of its coils L having a serial internal resistance $R_L$ wherein a plurality of these coils is arranged in a known manner circularly around a magnetic rotor. However, alternatively a linear stepper motor can be used as well.

In parallel to the coil L (or coil groups which are assigned to each other) each a voltage source is connected for generating a supply voltage $U_M$ (PWM voltage) by means of which in the first operational mode a certain target current (coil current) $I_L$ is impressed into the related coil(s) L. Furthermore a measuring resistor $R_S$ is connected in series to each coil L over which a measuring voltage $U_S$ drops in dependency on the actual (measuring) current flowing through the coil L.

In the ideal case such a stepper motor driver works virtually as an ideal current source if the supply voltage is sufficiently high and if the current not only drops passively ("slow decay") but actively ("fast decay").

The circuit arrangement furthermore comprises a measuring circuit M, the input of which is connected with the measuring voltage $U_S$ and which comprises a comparator K for comparing the measuring voltage $U_S$ with a reference voltage $U_R$, and a digital-to-analog converter DAC for generating the reference voltage from a digital signal which is supplied to the measuring circuit M. The reference voltage $U_R$ can as well be supplied in another way or in an analog form.

Furthermore a control circuit C is provided which generates the digital signal for the digital-to-analog converter DAC and to which the output signal of the comparator K is supplied. The control circuit C can be controlled via an interface I in order to switch over the switch S between the two switch positions 0 and 1 in dependency on the output signal of the comparator K and to provide this output signal to a further processing, respectively.

The measuring circuit M and the control circuit C usually exist in case of a coil current $I_L$ which is controlled by puls width modulation (PWM) so that the circuit arrangement according to the invention can be realized at low cost and with relatively low additional expenditure.

During the normal motor operation (first operational mode) the coils L are supplied in the first switch position 1 with phase shifted alternating currents in such a way that in a known manner a proceeding magnetic field is generated which the magnetic rotor follows stepwise or virtually continuously in micro-steps.

In order to impress a defined target current $I_L$ into the coil L (coil current), the measuring voltage $U_S$ which drops at the measuring resistance $R_S$ can be evaluated and used in a known manner for controlling and regulating, respectively, the voltage source which generates the supply voltage $U_M$.

By the movement of the rotor and the change of the magnetic flux caused by this, an electric voltage $U_{EMK}$ is (counter-) induced in the coil L which counteracts the supply voltage $U_M$ and which is dependent with respect to its course substantially on the velocity of the rotor and its current position relative to the coil. This voltage is indicated in the circuit diagram according to FIG. 1 by a voltage source which is connected in series to the coil L and which generates the voltage $U_{EMK}$.

Without any mechanical load (that means at a load angle of substantially 0 degree and an ideal internal resistance $R_L$ of the coil of 0 Ohm) the voltage $U_L$ across the terminals of the coil L is phase shifted by 90 degree relative to the impressed coil current $I_L$ (i.e. at an effective power of 0). The electrical power averaged over one period then equals zero. With increasing load angle this phase shift between the voltage $U_L$ and the coil current $I_L$ decreases. At a maximum load angle (i.e. short before a step loss) the phase shift finally is substantially zero and the power has a maximum.

At a stepper motor without any mechanical load which is supplied with sinusoidal and cosinusoidal coil currents $I_L$ with constant frequency, in the ideal case the counter induced voltages $U_{EMK}$ are as well sinusoidal and cosinusoidal and are phase shifted relative to the coil currents $I_L$ in the related coils L by 90 degree. However, phase shifts of constant kind and other courses of the voltages $U_{EMK}$ can as well be caused by the construction of the motor and especially by the geometric shape of the rotor and the stator and their magnetization.

Furthermore, especially in case of a mechanical load of the motor, decreased phase shifts between the voltage $U_{EMK}$ and the coil current $I_L$ occur by a load angle (angle between the rotor and the main direction of the magnetic field) which is different from zero.

If a stepper motor is mechanically loaded beyond a limit it can furthermore jump for one or more integral multiples of the current periode (in case of a two phase stepper motor four full steps) and in this way loose steps. In this case a phase shift between the coil current $I_L$ and the counter induced voltage $U_{EMK}$ as well occurs wherein the course of the voltage $U_{EMK}$ can change considerably due to the jumps. The phase of the counter induced voltage $U_{EMK}$ consequently represents substantially the position of the rotor.

The course of the target current $I_L$ through the coils L in time is not necessarily sinusoidal and cosinusoidal. In dependency on the type of the stepper motor, a better operation behavior can be achieved by trapezoid or triangular current patterns or composite patterns of those.

In a second operational mode the counter induced voltage $U_{EMK}$ however is nevertheless suitable for determining the above mentioned movement and load states of the stepper motor, i.e. its operating state, and by this as well for detecting a mechanical stop for example at a reference position because the level of the voltage $U_{EMK}$ and the phase position relative to the coil current $I_L$ is dependent on the velocity of the rotor and especially on the load angle of the rotor and by this on the load state of the motor.

More in detail the amplitude of the counter induced voltage $U_{EMK}$ is proportional to the velocity of the rotor. The phase of this voltage $U_{EMK}$ relative to the impressed coil current $I_L$ is substantially determined by the mechanical load. At a maximum possible load this phase shift decreases to a value of substantially 0. This is obvious from FIGS. 2 to 4 and shall be explained in more details below.

The voltage $U_{EMK}$ could be measured in case of a currentless coil $I_L$ directly at the terminals of the coil. However, because such a coil L would not contribute to the torque of the motor, this kind of detection is not desired. Also a quick change between a current conducting state and a non current conducting state is not desired because of the relatively high induction voltages which occur in this case.

For these reasons, according to the invention, the counter induced voltage $U_{EMK}$ is determined in the second operational mode by disconnecting the coil from the supply voltage $U_M$ and short-circuiting the coil, in fact each periodically within such time windows in which the current $I_L$ impressed into the concerned coil L is relatively low, i.e. short before and after the change of polarity of this current and the supply voltage $U_M$ impressing this current, respectively.

In order to achieve this, the switch S is switched over into the switch position 0.

The beginning of the time window needs not to be determined by monitoring the measuring voltage $U_S$ and comparing this voltage with a reference voltage. Instead the beginning and the duration of the time window is given by the known and fixed course, respectively, of the supply voltage $U_M$ and the course of the current $I_L$, respectively, impressed into the concerned coil so that the control circuit C for switching over the switch S can directly be controlled via the interface I accordingly.

In the thereby short-circuited coil circuit the counter induced voltage $U_{EMK}$ now drives a measuring current $I_{S,EMK}$ (current lobe) which generates at the measuring resistance $R_S$ a related voltage drop $U_{S,EMK}$.

This voltage $U_{S,EMK}$ is now evaluated by means of the measuring circuit M to determine the operating state of the motor and to determine whether the motor runs under a more or less high mechanical load or even against a mechanical stop, in order to switch the motor off immediately if necessary for avoiding wear.

For this purpose the voltage $U_{S,EMK}$ is compared in the comparator K with different threshold values $U_{SO}$, $U_{SU}$ which are set in dependency on the rotation velocity of the motor and are supplied as digital values via the interface I and the control circuit C to the digital-to-analog converter DAC (or even in analog form).

This evaluation shall be explained with reference to the diagrams in FIGS. 2 to 4 in which the vertical axis denotes the level of the current and the voltage, respectively, while at the horizontal axes the duration of the period is indicated.

The coil current $I_L$ flowing through the coil L in the region of the time window Z ($U_M=0$) is indicated by a solid line. This coil current $I_L$ is zero within the time window Z in which the coil circuit is short-circuited by switching over the switch S into the switch position 0. Instead of this, substantially a measuring current $I_{S,EMK}$ (indicated with broken lines, current lobe) flows within the time window Z which is caused by the counter induced voltage $U_{EMK}$ and by which a measuring voltage $U_{S,EMK}$ drops over the measuring resistance $R_S$.

Furthermore, the course of the counter induced voltage $U_{EMK}$ is indicated in these diagrams by means of a broken line.

Figure 2:
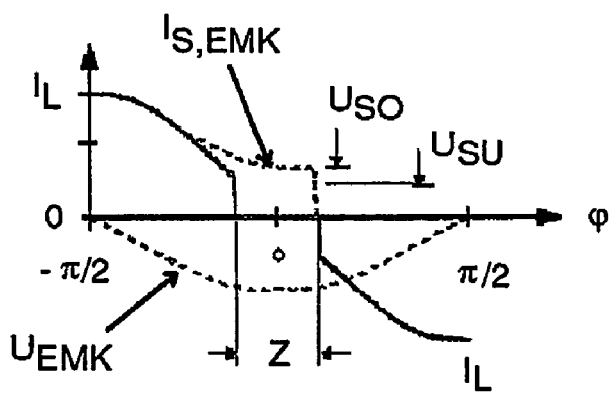
FIG. 2 a first diagram of the voltage and current curves in the region of the zero crossing of the coil current.
Figure 3:
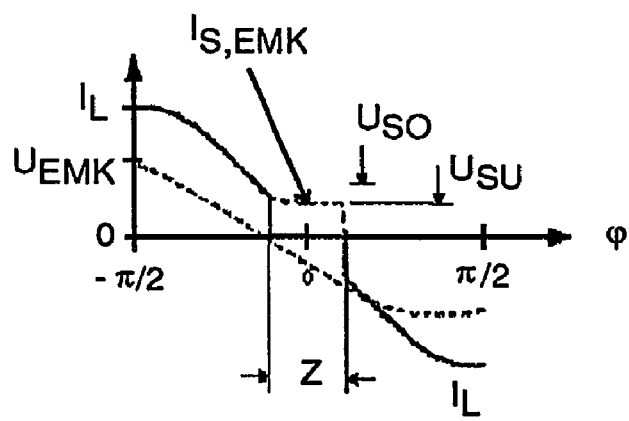
FIG. 3 a second diagram of the voltage and current curves in the region of a zero crossing of the coil current.

FIG. 2 shows the courses of these currents and voltages in case of a substantially unloaded state, i.e. at a minimal load angle, while in FIG. 3 the courses are indicated for a medium load and for a medium load angle. Finally FIG. 4 shows the courses of the currents and voltages for a maximum load and a maximum load angle.

As explained above the phase shift between the coil current $I_L$ and—during the second operational mode—between the measuring current $I_{S,EMK}$ through the coil L, respectively, and the counter induced voltage $U_{EMK}$ decreases with increasing load.

For the sake of completeness it shall be mentioned that as generally known the counter induced voltage $U_{EMK}$ is with respect to its polarity in opposite phase to the supply voltage $U_M$.

The level of the measuring current $I_{S,EMK}$ flowing during the time window Z (current lobe) and consequently the level of the measuring voltage $U_{S,EMK}$ generated by this during the time window Z is dependent on the rotation velocity and the angle of the load of the motor caused by a load and represents as well the received nonreactive power.

A change of the load results in a phase shift of the counter induced voltage $U_{EMK}$ and consequently in a change of the current impressed by this into the coil circuit. This change again results in a change of the measuring current $I_{S,EMK}$ (current lobe) flowing during the time window Z which change can be detected by evaluating the measuring voltage $U_{S,EMK}$.

Consequently, a change of the load of the motor can be detected by comparing the measuring voltage $U_{S,EMK}$ in successive time windows Z. Especially it is possible to detect a change of the load which occurs when driving against a mechanical stop, and to fix and define, respectively, in this way a reference position.

Changes of the load are preferably detected by comparing the measuring voltage $U_{S,EMK}$ during the time window Z with the threshold values which are set in dependency on the velocity of the motor.

For example according to FIGS. 2 to 4 an upper and a lower threshold value $U_{SO}$, $U_{SU}$ is fixed for the measuring voltage $U_{S,EMK}$ so that at a certain velocity and a relatively small load of the motor the measuring voltage $U_{S,EMK}$ is higher than the upper threshold value $U_{SO}$, while in case of an increase of the mechanical load which is caused by driving against a mechanical stop the measuring voltage $U_{S,EMK}$ is below the lower threshold value $U_{SU}$.

FIG. 2 shows the case in which during the time window Z a measuring current $I_{S,EMK}$ flows through the coil by which a measuring voltage $U_{S,EMK}$ is generated which corresponds to the upper threshold value $U_{SO}$.

According to FIG. 3 a measuring current $I_{S,EMK}$ flows through the coil by which a drop of the measuring voltage $U_{S,EMK}$ is caused which corresponds to the lower threshold value $U_{SU}$.

Figure 4:
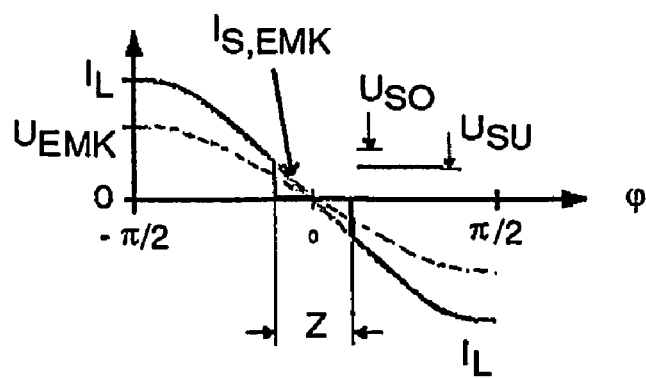
FIG. 4 a third diagram of the voltage and current curves in the region of a zero crossing of the coil current and FIG. 5 a schematic block diagram of a second circuit arrangement according to the invention.

Finally according to FIG. 4 the load is such high that the measuring current $I_{S,EMK}$ and consequently the drop of the voltage $U_{S,EMK}$ as well is substantially zero.

By means of the measuring circuit according to FIG. 1 therefore the measuring voltage $U_{S,EMK}$ is compared during a time window Z with both threshold values $U_{SO}$, $U_{SU}$ wherein the measuring voltage is applied to one input of the comparator K and each one threshold value is applied to the other input of the comparator K. The threshold values $U_{SO}$, $U_{SU}$ are supplied via the interface I and the control circuit C to the digital-to-analog converter DAC.

If the measuring voltage $U_{S,EMK}$ is smaller than the lower threshold value $U_{SU}$ a signal is generated via the control unit C and the interface I with which it is indicated that a reference position is reached at a mechanical stop.

If the measuring voltage $U_{S,EMK}$ is between both threshold values $U_{SO}$, $U_{SU}$, in a corresponding manner a signal can be generated with which an increased motor load as indicated.

If finally the measuring voltage $U_{S,EMK}$ is greater than the upper threshold value $U_{SO}$ a signal can be generated for indicating that the motor is running with a relatively small load.

For the realization of the invention it is demanded as a boundary condition that the internal resistance $R_L$ of the related coils L is in the dimension of the measuring resistance $R_S$ so that the measuring voltage $U_{S,EMK}$ is sufficiently high when measuring the load, i.e. in the region of the measuring voltage $U_S$ in normal operation. If a measuring resistance $R_S$ is provided which can be switched over, the solution according to the invention can be applied as well with high-impedance motors. If however $R_L >> R_S$ so the measuring circuit M should have a sufficiently high amplification.

Particular advantages of the invention are given by the fact that the measuring voltage $U_{S,EMK}$ is independent on the supply voltage $U_M$ because it is detected during a time window in which the supply voltage (PWM) is not applied. The current loop which is generated by short-circuiting the coil circuit has a low impedance so that the measuring voltage $U_{S,EMK}$ is relatively insensitive to disturbances. Furthermore the measuring resistance $R_S$ effects a current limitation when the coil circuit is short-circuited.

Due to the control of the coil current $I_L$ during the first operational mode (normal operation) particularly well reproducible conditions are created during the second operational mode for measuring the level of the measuring current $I_{S,EMK}$ (current lobe). If in contrary to that the stepper motor would be driven at a voltage source, so the level of the current lobe would be dependent on the level of the supply voltage which had to be considered accordingly.

Figure 5:
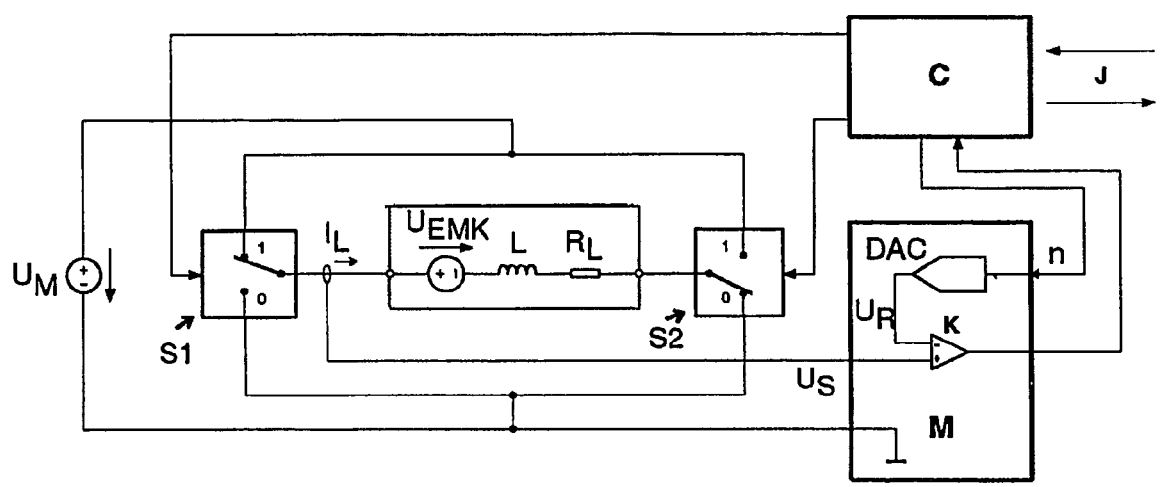

Finally FIG. 5 shows a principal block diagram of a second circuit arrangement according to the invention in which similar and corresponding components, respectively, as in FIG. 1 are denoted with the same references.

In contrast to the embodiment shown in FIG. 1, in this case the PWM supply voltage $U_M$ can be commutated by means of a first and a second switch S1, S2 which are switched by the control circuit C. The second operational mode during which the measuring current $I_{S,EMK}$ which is generated by the counter induced voltage $U_{EMK}$, is detected and evaluated according to the explanations above, is in this case activated immediately after commutation of the PWM supply voltage, i.e. immediately after switching over both switches S1, S2 wherein before this the measuring current may not be controlled to zero (Slow-Decay operational mode).

Furthermore it is indicated in this embodiment that the measuring voltage which is supplied to the comparator has not necessarily to be generated by a voltage drop by means of a resistance $R_S$. Instead, Hall-sensors, current dividers in MOSFET-switches or other components, possibly at other locations of the circuit arrangement, can be used as well with which a signal is generated which is proportional to the measuring current flowing through the coil L and which can be compared with the related threshold values.

As explained above, with the disclosed circuit arrangements not only a mechanical stop but as well a load and possibly a suddenly occurring obstacle can be detected so that a monitoring of the operation of the motor is possible. A measurement of the load angle is possible as well.

In contrary to numerous known approaches for determining a stop, it is not necessary according to the invention that the motor jumps back.

By the coil circuit which is short-circuited in the region of the zero crossing of the supply voltage and of the impressed coil current, respectively, possible resonance oscillations are attenuated (comparable with the principle of the eddy current break).

The phase shift and the decrease of the amplitudes of the periodic coil current $I_L$ react very sensitive to a change of the load, however, at the same time, both these values are very insensitive to other disturbances which have no relationship to this, like for example the irradiation of electric energy. By this a very exact detection of also small changes of the load is as well possible. Furthermore the coil in the coil circuit smoothens possible electric disturbances so that their influence is further decreased.

The measuring conditions are very well defined during the time window Z and consequently very well reproducible. The current $I_{S,EMK}$ flowing during the time window Z is only dependent on the rotation velocity of the motor, the load angle and constant motor values, however, not or only to a very small extent dependent on parameters which show a drift or vary due to a spread of material properties.

Finally it shall be noted that the method and circuit arrangement according to the invention is suitable for application with other synchronous motors as well, as long as these are dimensioned such that at least one of the coil circuits can be short-circuited.

What is claimed is:

1. A method for operating stepper motors, comprising
a first operational mode for a normal motor operation in which an alternating current ($I_L$) is impressed into at least one of the coils (L) of the stepper motor, and
a second operational mode for detecting a reference position of the stepper motor from an increase of the load caused by driving the stepper motor against a mechanical stop, by comparing the level of a measuring current ($I_{S,EMK}$) flowing in the coil (L), with at least one lower threshold value,
wherein the level of the measuring current ($I_{S,EMK}$) is determined substantially by the phase of a voltage ($U_{EMK}$) which is counter induced by a rotor of the motor in the coil (L),
wherein the reference position is set and defined, respectively, when the measuring current ($I_{S,EMK}$) becomes smaller than the lower threshold value, and
wherein the second operational mode for the coil (L) is activated during a time window (Z) of the first operational mode either by short-circuiting the coil (L) when the alternating current ($I_L$) impressed into the coil (L) approaches a zero crossing, or by reversing the polarity of the alternating current ($I_L$) impressed into the coil.

2. The method according to claim 1, wherein the level of the measuring current ($I_{S,EMK}$) flowing through the coil (L) during the second operational mode is compared with at least one upper threshold value which is set in dependency on the velocity of the motor and which is greater than the lower threshold value, in order to detect a low load state of the motor when the measuring current ($I_{S,EMK}$) is greater than the upper threshold value.

3. The method according to claim 1, wherein the lower threshold value is set in dependency on the velocity of the motor in order to detect a high load state when the measuring current ($I_{S,EMK}$) is smaller than the lower threshold value.

4. The method according to claim 1, wherein the time window (Z) for the second operational mode is embedded into the first operational mode such that it is substantially symmetrically positioned relative to the zero crossing of the alternating current ($I_L$) which is impressed into the related coil (L) during the first operational mode.

5. The method according to claim 1, wherein the level of the measuring current ($I_{S,EMK}$) flowing in the short-circuited coil (L) is detected from a voltage drop ($U_{S,EMK}$) at a measuring resistance ($R_S$) and is compared with threshold values in the form of voltages ($U_{SO}$, $U_{SU}$).

6. A circuit arrangement for operating stepper motors, according to a method according to one of the preceding claims, comprising
a device (S; M, $R_S$; C) for determining a reference position of the stepper motor from an increase of the load which is caused by driving the stepper motor against a mechanical stop, with a measuring circuit (M) for comparing the level of a measuring current ($I_{S,EMK}$) flowing in a coil (L) of the motor,
wherein the level is substantially determined by the phase of a voltage ($U_{EMK}$) which is counter induced by a rotor of the motor in the coil (L), with at least one lower threshold value when either the alternating current ($I_L$) which is impressed into the coil (L) during a normal motor operation approaches a zero crossing and the coil (L) is short-circuited, or the direction of the alternating current is reversed.

7. The circuit arrangement according to claim 6, wherein the device (S; M, $R_S$; C) comprises a measuring resistance ($R_S$) and the measuring circuit (M) comprises a comparator (K) for comparing a measuring voltage ($U_{S,EMK}$) which drops at the measuring resistance ($R_S$) by the measuring current ($I_{S,EMK}$), with the at least one lower threshold value ($U_{SU}$).

8. The circuit arrangement according to claim 7, wherein the device (S; M, $R_S$; C) comprises a control circuit (C) and the measuring circuit (M) comprises a digital-to-analog converter (DAC), the input of which is connected with an output of the control circuit (C) and the output of which is connected with an input of the comparator (K) for applying the at least one lower and an upper threshold value ($U_{SO}$, $U_{SU}$), wherein the threshold values are set in dependency on the rotation velocity of the motor and are supplied by the control circuit (C) in order to detect an operating state and a load state, respectively, by comparing the measuring voltage ($U_{S,EMK}$) with the threshold values.

9. The circuit arrangement according to claim 8, in wherein control circuit (C) is provided for controlling a switch (S) for periodically switching over between the first and the second operational mode in dependency on the frequency of the alternating current ($I_L$) which is impressed into the coil.

10. The computer program comprising program code means for conducting a method according to claim 1 when the program is conducted on a micro-computer.

* * * * *